(12) United States Patent
Frea et al.

(10) Patent No.: US 11,465,598 B2
(45) Date of Patent: Oct. 11, 2022

(54) SYSTEM AND METHOD FOR DETERMINING A WHEEL-RAIL ADHESION VALUE FOR A RAILWAY VEHICLE

(71) Applicant: FAIVELEY TRANSPORT ITALIA S.p.A., Piossasco (IT)

(72) Inventors: Matteo Frea, Turin (IT); Luc Imbert, Turin (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 71 days.

(21) Appl. No.: 16/764,069

(22) PCT Filed: Dec. 3, 2018

(86) PCT No.: PCT/IB2018/059559
§ 371 (c)(1),
(2) Date: May 14, 2020

(87) PCT Pub. No.: WO2019/111127
PCT Pub. Date: Jun. 13, 2019

(65) Prior Publication Data
US 2020/0377064 A1 Dec. 3, 2020

(30) Foreign Application Priority Data
Dec. 4, 2017 (IT) .................. 102017000139662

(51) Int. Cl.
*B60T 8/17* (2006.01)
*B60T 8/171* (2006.01)
*B60T 8/172* (2006.01)
*B60T 17/22* (2006.01)

(52) U.S. Cl.
CPC ............ *B60T 8/1705* (2013.01); *B60T 8/171* (2013.01); *B60T 8/172* (2013.01); *B60T 17/228* (2013.01); *B60T 2210/12* (2013.01)

(58) Field of Classification Search
CPC ......... B60T 8/1705; B60T 8/171; B60T 8/172
See application file for complete search history.

(56) References Cited

U.S. PATENT DOCUMENTS

| | | | | |
|---|---|---|---|---|
| 6,050,126 A | * | 4/2000 | Miyazaki | ................. B60T 8/52 73/11.07 |
| 2005/0012501 A1 | * | 1/2005 | Isono | ..................... B60T 8/172 324/300 |
| 2007/0001629 A1 | * | 1/2007 | McGarry | ............... B61C 15/14 318/52 |

* cited by examiner

*Primary Examiner* — Imran K Mustafa
(74) *Attorney, Agent, or Firm* — The Small Patent Law Group LLC; Philip S. Hof

(57) ABSTRACT

A system for determining a wheel-rail adhesion value for a railway vehicle including at least one axle to which two wheels having a radius are coupled is provided. The system includes a deformation detection circuit coupled to an axle arranged to detect a torsional deformation of the axle due to a longitudinal adhesion force transferred from the axle to the rail, and a controller arranged to estimate a torque value as a function of the torsional deformation detected to convert the estimated torque value into the longitudinal adhesion force value as a function of the radius of the wheels, and to calculate the wheel-rail adhesion value through the ratio between the longitudinal adhesion force value and a normal load value that the axle exerts on the rail. A method for determining a wheel-rail adhesion value for a railway vehicle is also provided.

20 Claims, 4 Drawing Sheets

Measurement of deformation of the wheelset (axle and/or wheel) through the use of strain gauge sensors Calibration of the measurement system Measurement of contact forces: stresses and strains to which the wheelset and the rail are subjected Monitoring of the infrastructure and rolling stock and the maintenance thereof

SYSTEM AND METHOD FOR DETERMINING A WHEEL-RAIL ADHESION VALUE FOR A RAILWAY VEHICLE

CROSS-REFERENCE TO RELATED APPLICATIONS

This application is a National Phase filing of PCT International Application No. PCT/IB2018/059559, having an International Filing Date of Dec. 3, 2018, claiming priority to Italian Patent Application No. 102017000139662, having a filing date of Dec. 4, 2017 each of which is hereby incorporated by reference in its entirety.

FIELD OF THE INVENTION

The present invention relates to systems for monitoring the wheel-rail contact forces for a railway vehicle. More particularly, the present invention refers to a system and a method for determining a wheel-rail adhesion value for a railway vehicle.

BACKGROUND OF THE INVENTION

While running on a track, railway vehicles discharge forces to the ground through wheel-rail contact, which allows the train to follow the track. The forces exchanged depend on the characteristics of the track, the dynamic behavior of the train and the load the latter is transporting.

In recent years, systems for monitoring the wheel-rail contact forces have attracted the interest of various actors in the Railway sector, such as Infrastructure Managers (IM) and Railway Undertakings (RU). The interest is focused on monitoring in real time the rolling stock in circulation and reporting any non-compliance to the Railway Undertakings (RU) in order to take the related corrective actions.

Contact force monitoring systems may be classified into:
systems installed on board the train;
axle and/or wheel deformation measurement systems;
systems used primarily at the time of rolling stock approval;
systems installed on the ground;
track deformation measurement systems; and
systems used primarily as diagnostic systems to be used for medium- to long-term periods.

The amount of contact forces exchanged between the wheel and the rail is subject to compliance with the limits established in the standard UNI EN14363. Such standard regulates the performance of quasi-static and dynamic tests for the purpose of rolling stock approval. The limits imposed by the standard are directly related to:

the structural performance the track must provide;
safety with regard to derailment;
maintenance of the correct track geometry over time; and
comfort of travel.

By focusing on the measuring systems installed on board the train, the contact forces may be broken down into three spatial directions, i.e. vertical forces $F_{vert}$, lateral forces $F_{lat}$, and longitudinal forces $F_{long}$ (as illustrated in FIG. 1).

Various methods for measuring contact forces have been developed over the years. These known methods are essentially based on estimating contact forces by measuring the deformation of a wheelset at various points. The term "wheelset" is used to indicate the assembly consisting of two wheels and the axle that connects them. Such points may be positioned on the axle or on the centers of the wheels. The measurement of the forces, therefore, is not direct and requires a calibration operation to determine the value of the contact forces from the deformation measurements.

It is known in the art to install one or more strain gauges (in various configurations: Wheatstone bridge, etc.) on the axle and/or on the wheel of a railway vehicle, to calibrate the measuring system and to estimate the contact forces starting from the deformation of the axle.

At present, therefore, the sole main objective for estimating the wheel-rail contact forces is to monitor the infrastructure and rolling stock and the relative scheduling of maintenance and/or correction operations thereof (as shown in the block diagram in FIG. 2).

Disadvantageously, there are no known systems or methods which allow an estimate of wheel-rail adhesion to be obtained via an estimate of the wheel-rail contact forces.

Other systems and methods for measuring wheel-rail adhesion are described, for example, in patent documents WO2013034698 and EP2918459. In such systems and methods, the wheel-rail adhesion is estimated only via indirect measurements (optical, temperature or conductivity sensors, etc.) or via adhesion observatories based on the braking or traction force applied to the axle.

In such adhesion observatories, disadvantageously, the estimate of the braking force from the pressure on the brake cylinder is not very precise and reliable, as it is subject to a series of errors (which propagate according to the theory of error propagation) due to the mechanical characteristics and efficiency of the actuator, a great variability of the pad-disc friction coefficient depending on the operating conditions (pad temperature, disc temperature, rotary speed, clamping force, etc.) and environmental conditions (external temperature, humidity, etc.).

Similarly, the estimation of the traction/braking force from the electric current produced/regenerated by the motor is subject to the error related to the conversion between current and torque typical of any electric motor.

Furthermore, known systems do not take into account the fact that, in case of degraded adhesion (contaminant on the rail, etc.), not all applied braking or traction force is transferred to the rail (i.e. not all applied braking/traction force becomes longitudinal adhesion force).

A further example of systems suffering from the disadvantages indicated above is brought by earlier Italian patent application No. 102016000034535 in the name of the instant applicant, which determines the adhesion by the following formula:

$$\mu(T_n) = \frac{1}{m \cdot g} \cdot [F_m(T_n) + J/R \cdot \dot{\omega}(T_n)]$$

where:
Fm is the estimate of the braking or traction force.

In the case of braking, the braking force Fm is obtainable by multiplying the pressure applied to the brake cylinder, known to the system, by the pressure-force conversion coefficients typical of the pneumatic actuator, the lever ratio and leverage efficiency, and the friction coefficient between the pad and the disc in the case of disc brakes. Similarly, the braking force Fm may be obtained in the case of traction or electrodynamic braking by means of the electric current value supplied/regenerated by the motor respectively in traction or braking. In case of blended braking, the sum of the two contributions of pneumatic and electrodynamic braking, appropriately weighted by their respective coefficients, will provide the braking force Fm.

SUMMARY OF THE INVENTION

One of the objects of the present invention is to provide an estimate of the longitudinal forces transferred from the axle to the rail starting from the torsional deformations of the axle. Such torsional deformations are used to estimate a direct wheel-rail adhesion value, as a function of the longitudinal force transferred to the rail, i.e., estimating an effective force for braking or traction of the axle, without the need to estimate the braking or traction forces applied.

To obtain such result, a system is proposed for determining a wheel-rail adhesion value for a railway vehicle including at least one axle to which two wheels having a radius R are coupled.

Such system comprises a deformation detection circuit coupled to a rail vehicle axle.

The deformation detection circuit is provided to detect a torsional deformation of the axle due to the force transferred from the axle to the rail.

The system for determining a wheel-rail adhesion value further comprises a controller provided to estimate a torque value as a function of the torsional deformation detected by the deformation detection circuit.

Said controller is further provided to convert the estimated torque value into a longitudinal adhesion force value as a function of the radius R of the wheels, and to calculate a wheel-rail adhesion value through the ratio between said longitudinal adhesion force value and a normal load value that the axle exerts on the rail.

A corresponding method for determining a wheel-rail adhesion value is also provided.

According to one aspect of the present invention, the aforesaid and other objects and advantages are achieved by the system and the method for determining a wheel-rail adhesion value described in detail below. Preferred embodiments of the invention are also described.

The functional and structural characteristics of some preferred embodiments of a system and a method for determining the wheel-rail adhesion according to the invention will now be described with reference to the accompanying drawings.

DETAILED DESCRIPTION

Figure 1:
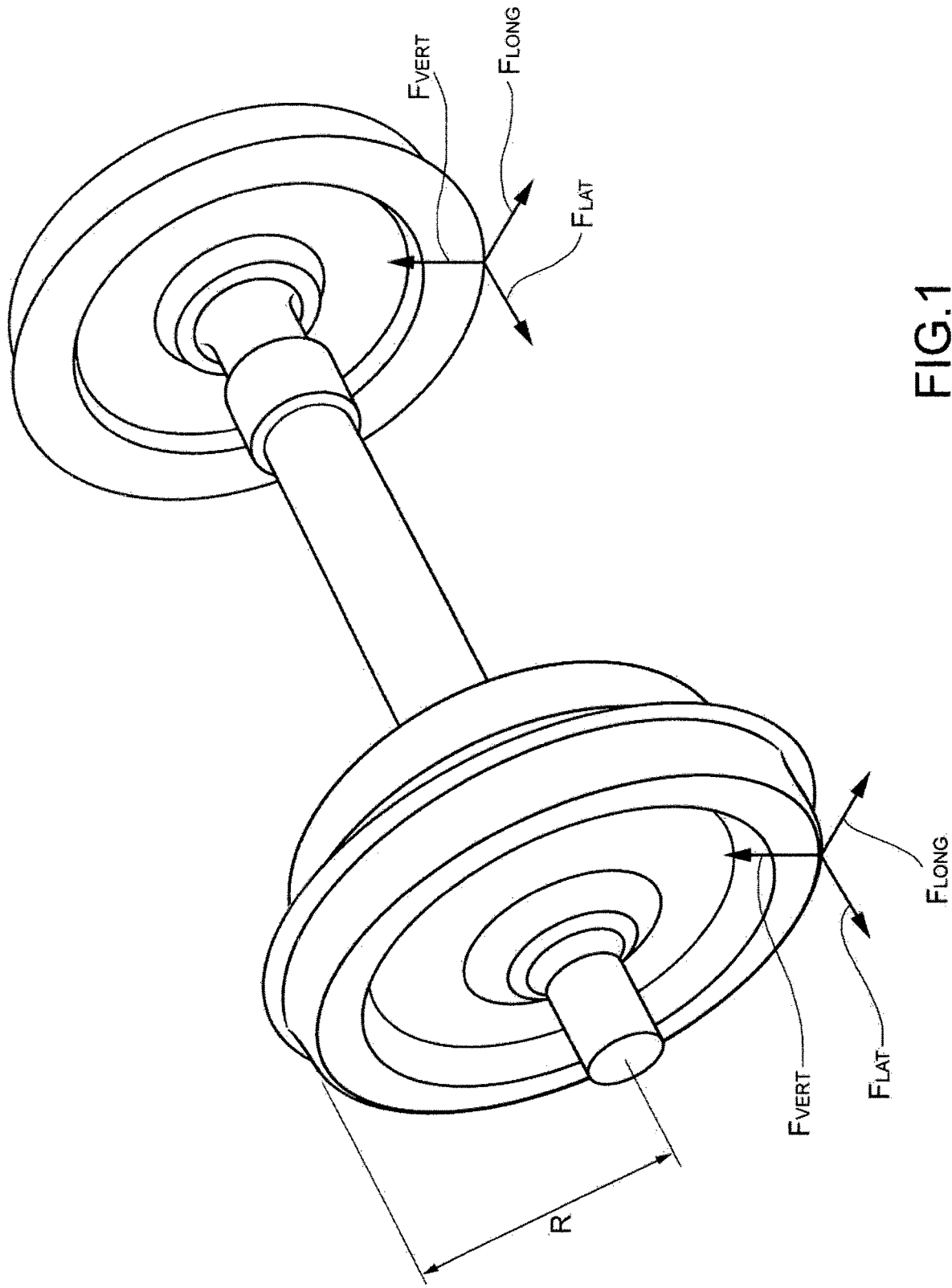
FIG. 1 illustrates an axle of a railway vehicle resting on a rail, and the contact forces, broken down into three spatial directions, which identify the vertical forces, lateral forces and longitudinal forces.
Figure 2:
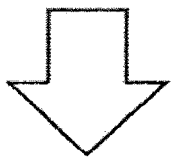
FIG. 2 shows a block diagram illustrating the steps usually taken by systems built according to the prior art.
Figure 2:
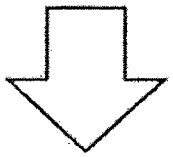
Figure 2:
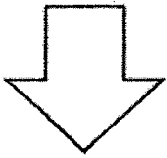

Before describing in detail a plurality of embodiments of the present invention, it should be clarified that the invention is not limited in its application to the details of construction and to the configuration of the components presented in the following description or illustrated in the drawings. The invention may assume other embodiments and may be implemented or achieved in different ways. It should also be understood that the phraseology and terminology have descriptive purposes and should not be construed as limiting. The use of "include" and "comprise" and the variations thereof are to be understood as encompassing the elements stated hereinafter and the equivalents thereof, as well as additional elements and the equivalents thereof.

Moreover, throughout the present description and in the claims, terms and expressions indicating positions and orientations, such as "longitudinal", "transverse", "vertical" or "horizontal", refer to the direction of travel of the train.

Figure 3:
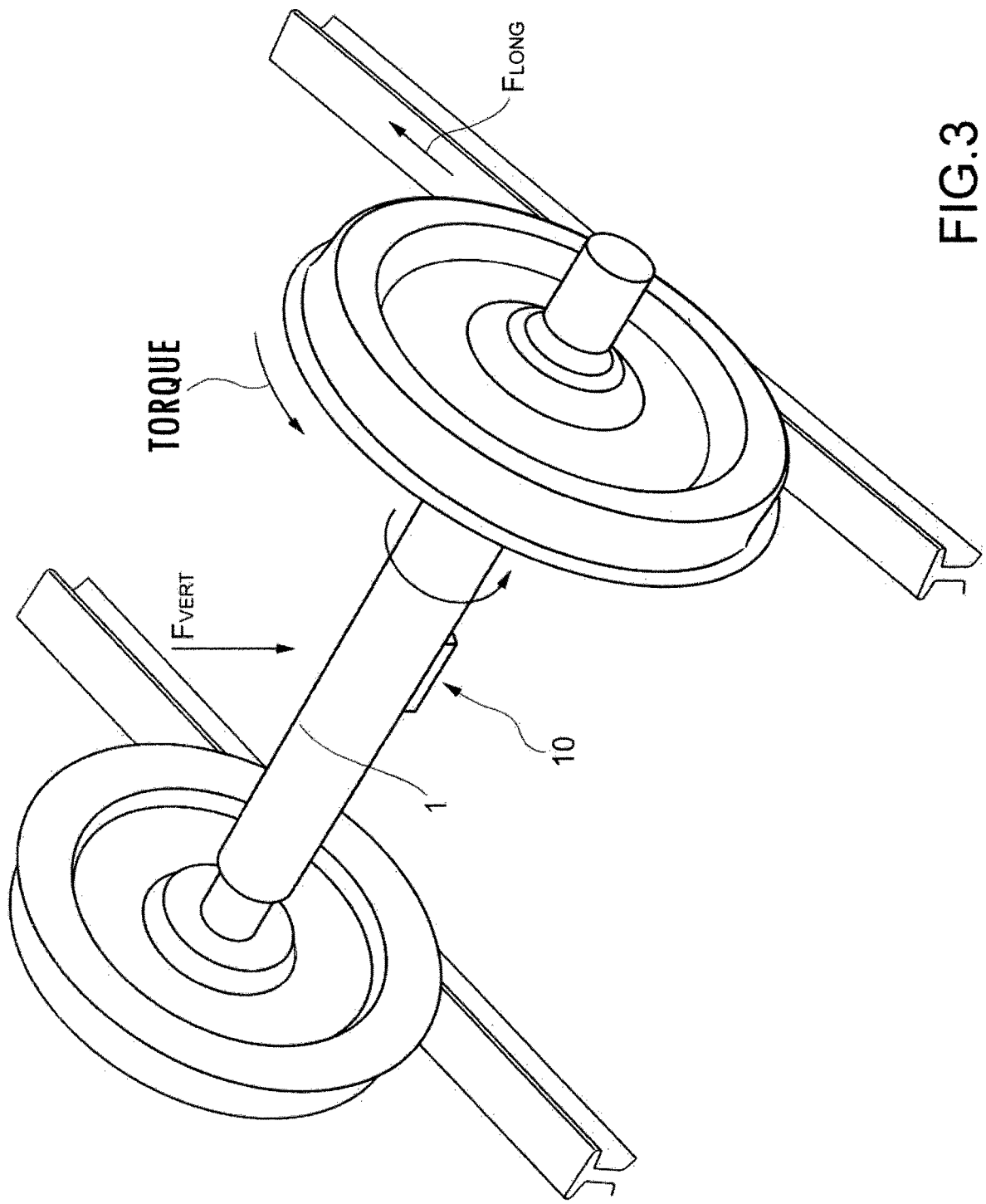
FIG. 3 illustrates an axle of a railway vehicle to which a deformation detection circuit is coupled.

FIG. 3 illustrates, by way of example, an axle 1 of a railway vehicle to which is coupled a deformation detection circuit 10 belonging to the system for determining a wheel-rail adhesion value according to the present invention.

In one embodiment of the invention, the system for determining a wheel-rail adhesion value for a railway vehicle that includes at least one axle 1 with two wheels having a radius R coupled thereto, comprises a deformation detection circuit 10 coupled to an axle 1 of the railway vehicle.

The deformation detection circuit is provided to detect a torsional deformation of the axle due to a longitudinal adhesion force $F_{long}$ (along the direction of travel of the train) transferred by the axle to the rail.

The system for determining a wheel-rail adhesion value further comprises a controller provided to estimate a torque value as a function of the torsional deformation detected by the deformation detection circuit.

The controller is further provided to convert the estimated torque value into a longitudinal adhesion force value $F_{long}$ as a function of the radius R of the wheels, and to calculate a wheel-rail adhesion value through the ratio between said longitudinal adhesion force value $F_{long}$ and a normal load value that the axle exerts on the rail.

The normal load value may be determined by the static mass acting on the axle or by known dynamic load measurement systems (e.g. load cells, suspension pressure, etc.).

The conversion of the estimated torque value into a longitudinal adhesion force value $F_{long}$ may be done, for example, by means of a ratio between the estimated torque value and the value of the radius R of the wheels by said controller. The formula used for the conversion may be, for example, the following:

$$\text{Adhesion force[N]} = \text{Torque [Nm]}/R \text{ [m]};$$

The controller may be arranged locally close to, or directly in, the deformation detection circuit 10. Alternatively, the controller may be arranged remotely relative to the deformation detection circuit 10 in other vehicle on-board control units or in remote control stations relative to the railway vehicle. Therefore, the controller may receive data from the deformation detection circuit either via special wiring or via a wireless connection (telemetry).

The controller may be a control unit, a processor or a microcontroller.

Figure 4:
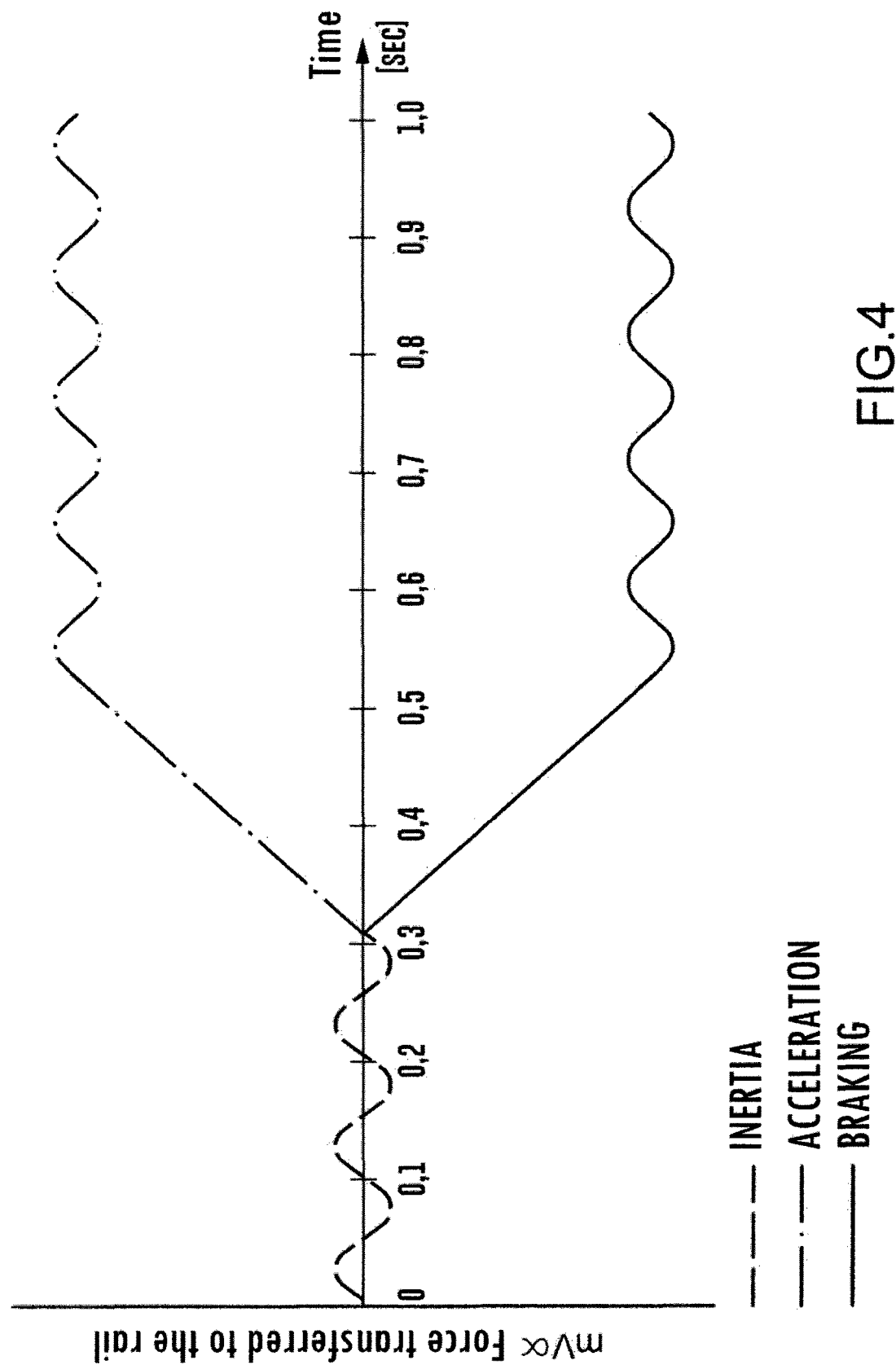
FIG. 4 illustrates, by way of example, the signal generated by the deformation detection circuit subjected to a torsional deformation during the movement of a train.

In other words, referring to the evaluation of torsional deformation of FIG. 4, the mean value of the torsional stress to which the axle is subjected is correlated to the longitudinal forces exchanged between the wheels of the axle and the rail.

If the vehicle is stationary and no external torques are applied to the axle (e.g. traction or braking torques), the torsional component obtained from the strain gauge measurements is zero.

If the vehicle is moving and the axle is not subjected to either a traction force or a braking force (coasting state), the mean value of the torsional component is zero, even though it has a periodic oscillation linked to the rotational frequency and the natural frequency of the axle (typically on the order of 70 Hz).

If, on the other hand, external torques are applied to the axle, such as a braking torque or a traction torque, the axle is subjected to torsional stress.

The output signal from the deformation detection circuit 10 has an average value proportional to the longitudinal adhesion force $F_{long}$ transferred from the axle to the rail, with the opposite sign depending on whether it is a traction action or a braking action.

The deformation detection circuit 10 may comprise at least one strain gauge sensor and/or at least one piezoelectric sensor.

For example, in the above-described case, the deformation detection circuit may be made using a known Wheatstone bridge configuration. In other words, the deformation detection circuit 10 comprises a strain gauge sensor bridge, configurable with the known "quarter bridge", "half bridge" or "full bridge" variants.

To improve measurement accuracy, there may be more than one strain gauge sensors and/or piezoelectric sensors.

The longitudinal force $F_{long}$ transferred from the axle to the rail is the adhesion force.

The adhesion coefficient µ is by definition the ratio of the longitudinal adhesion force $F_{long}$ and the normal load force $F_{vert}$. That is to say:

µ=Adhesion force/Normal load force.

The present invention further provides a method for determining a wheel-rail adhesion value for a railway vehicle including at least one axle to which two wheels having a radius R are coupled, the method comprising the steps of:
  detecting a torsional deformation of the axle due to a longitudinal adhesion force $F_{long}$ transferred from the axle to the rail;
  estimating a torque value as a function of the detected torsional deformation;
  converting the estimated torque value into a longitudinal adhesion force value $F_{long}$ according to the radius R of the wheels; and
  calculating a wheel-rail adhesion value through the ratio between said longitudinal adhesion force value $F_{long}$ and a normal load value exerted by the axle on the rail.

The conversion of the estimated torque value into a longitudinal adhesion force value $F_{long}$ may be done, for example, by means of a ratio between the estimated torque value and the value of the radius R of the wheels.

The advantage provided by the present invention is that it allows an estimation of the longitudinal forces starting from the torsional deformations of the axle.

A further advantage consists in allowing a measurement of a direct wheel-rail adhesion value to be obtained as a function of the longitudinal force transferred to the rail, i.e., by estimating an effective force for braking or traction of the axle, without the need to estimate the braking or traction forces applied.

Different aspects and embodiments of a system and a method for determining a wheel-rail adhesion value according to the invention have been described. It is to be understood that each embodiment may be combined with any other embodiment. The invention, moreover, is not limited to the described embodiments, but may vary within the scope of protection as described and claimed herein.

The invention claimed is:

1. A system for determining a wheel-rail adhesion value for a railway vehicle, the system comprising:
  a deformation detection circuit coupled to an axle of the railway vehicle, the axle coupled to at least two wheels, the deformation detection circuit configured to detect a torsional deformation of the axle due to a longitudinal adhesion force transferred from the axle to a rail via the at least two wheels; and
  a controller configured to estimate a torque value as a function of the torsional deformation detected by the deformation detection circuit, the controller being further configured to convert the torque value into a longitudinal adhesion force value as a function of a radius of the at least two wheels coupled to the axle, and to calculate a wheel-rail adhesion value through a ratio between the longitudinal adhesion force value and a normal load value that the axle exerts on the rail via the at least two wheels, the controller configured to control application of at least one of a braking force or a tractive force to the axle based on the wheel-rail adhesion value to control movement of the railway vehicle.

2. The system of claim 1, wherein the controller is configured to convert the torque value into the longitudinal adhesion force value through a ratio between the torque value and the radius of the at least two wheels.

3. The system of claim 1, wherein the deformation detection circuit comprises at least one strain-gauge sensor.

4. The system of claim 1, wherein the deformation detection circuit comprises a bridge of multiple strain-gauge sensors.

5. The system of claim 1, wherein the deformation detection circuit comprises at least one piezoelectric sensor.

6. The system of claim 1, wherein the controller is configured to convert the torque value into the longitudinal adhesion force value by dividing the torque value by the radius of the at least two wheels.

7. The system of claim 1, wherein the controller is configured to calculate the wheel-rail adhesion value by dividing the longitudinal adhesion force value by the normal load value.

8. The system of claim 1, wherein the controller is disposed in the deformation detection circuit that is coupled to the axle.

9. The system of claim 1, wherein the controller is configured to determine the normal load value that the axle exerts on the rail via the wheels via a dynamic load measurement system.

10. The system of claim 1, wherein the controller is configured to determine the normal load value that the axle exerts on the rail via the wheels via load cells.

11. A method for determining a wheel-rail adhesion value for a railway vehicle, the method comprising:
  detecting a torsional deformation of an axle of the railway vehicle due to a longitudinal adhesion force transferred from the axle to a rail via at least two wheels coupled to the axle;
  estimating a torque value as a function of the torsional deformation that is detected;
  converting the torque value into a longitudinal adhesion force value as a function of a radius of the at least two wheels coupled to the axle;
  calculating a wheel-rail adhesion value through a ratio between the longitudinal adhesion force value and a normal load value exerted by the axle on the rail via the at least two wheels; and applying at least one of a braking force or a tractive force to the axle based on the wheel-rail adhesion value to control movement of the railway vehicle.

12. The method of claim 11, wherein the torque value is converted into the longitudinal adhesion force value through a ratio between the torque value and the radius of the at least two wheels.

13. The method of claim 11, wherein the torsional deformation of the axle is detected using at least one strain-gauge sensor.

14. The method of claim 11, wherein the torsional deformation of the axle is detected using at least one piezoelectric sensor.

15. The method of claim 11, wherein the torque value is converted into the longitudinal adhesion force value by dividing the torque value by the radius of the at least two wheels.

16. The method of claim 11, wherein the wheel-rail adhesion value is calculated by dividing the longitudinal adhesion force value by the normal load value.

17. The method of claim 11, further comprising determining the normal load value that the axle exerts on the rail via the wheels via a dynamic load measurement system.

18. The method of claim 11, further comprising determining the normal load value that the axle exerts on the rail via the wheels via load cells.

19. The method of claim 11, further comprising coupling a deformation detection circuit to the axle, the deformation detection circuit configured to detect the torsional deformation of the axle.

20. The method of claim 19, wherein at least the estimating, converting, and calculating steps of the method are performed by a controller that is disposed in the deformation detection circuit coupled to the axle.

* * * * *